Fig. 6

INVENTORS
BERNARD J. RAINEY,
EDWIN R. SMITH.
BY Charles T. Hawley
ATT'Y.

Fig. 7

March 8, 1960  B. J. RAINEY ET AL  2,927,703
WORK-HANDLING MECHANISM FOR MACHINE TOOL
Filed Oct. 9, 1956  9 Sheets-Sheet 6

INVENTORS
BERNARD J. RAINEY.
EDWIN R. SMITH.
BY Charles T. Hawley

ATT'..

INVENTORS
BERNARD J. RAINEY,
EDWIN R. SMITH.

United States Patent Office 2,927,703
Patented Mar. 8, 1960

2,927,703

WORK-HANDLING MECHANISM FOR MACHINE TOOL

Bernard J. Rainey, Waterloo, and Edwin R. Smith, Seneca Falls, N.Y., assignors to Seneca Falls Machine Company, Seneca Falls, N.Y., a corporation of Massachusetts Application October 9, 1956, Serial No. 614,935

5 Claims. (Cl. 214—1)

This invention relates to mechanism by which duplicate pieces of work may be automatically fed to a machine tool or to other similar apparatus and may be thereafter automatically removed therefrom and replaced by a new workpiece.

More specifically, the invention relates to work-handling mechanism of the general type in which the discharge of a finished piece from the unloading part of the mechanism and the supply of a new piece to the loading part of the mechanism will take place at a station which is substantially removed axially from the operative locus of the lathe or other machine tool.

Work-handling mechanism of this general type is shown in the prior patent to Dinsmore and Smith #2,714,324 issued August 2, 1955.

It is the general object of this invention to improve and simplify the construction and control of such work-handling mechanism to the end that more satisfactory and reliable operation may be attained.

To the accomplishment of this general object, mechanism is provided in which the sequence and timing of the loading, unloading and reloading operations are mechanically controlled, as by cam actuation.

Improved headstock and tailstock constructions are also provided, together with improvements in the work-supporting and work-driving devices. Air-operated devices are utilized in the control of certain clutches and other features of the mechanism.

This improved work-handling mechanism is particularly designed for convenient application to commercial machine tools and other similar apparatus which may be of relatively varied constructions.

The invention further relates to arrangements and combinations of parts which will be hereinafter described and more particularly set forth in the appended claims.

A preferred form of the invention is shown in the drawings, in which.

General description

The general construction of the mechanism and the sequence of operations may be briefly described as follows:

A loader carriage is provided which is adapted to remove a finished workpiece from lathe centers or other operating locus, and to insert a new workpiece at said centers or locus.

Special head and tailstock mechanisms then cooperate to center and drive the new workpiece, and any desired machining or finishing operation is performed thereon.

During such operation on the workpiece, the loader carriage is removed, preferably axially, to a relatively remote position in which the previously finished workpiece is discharged and a new workpiece is supplied.

The loader carriage is then returned to its initial operating position and awaits completion of the desired machining or finishing operation on the workpiece then in working position in the machine. On completion of the operation, the above-described unloading, loading, discharge and reloading cycle is again performed.

Figure 1:
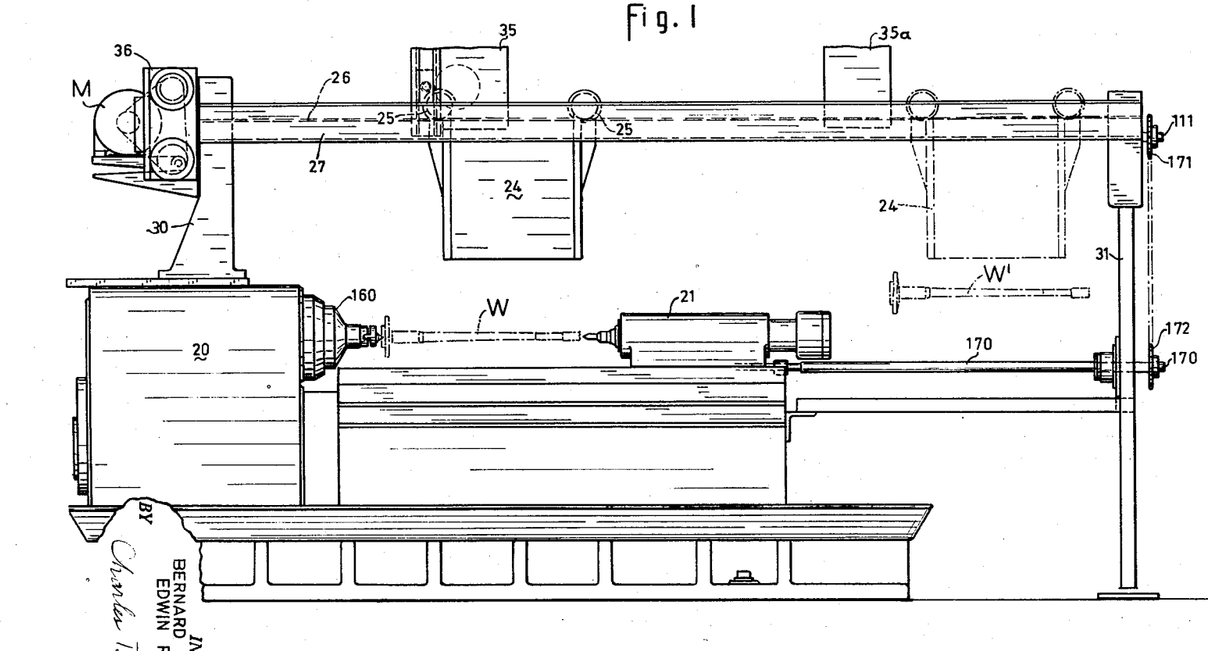
Fig. 1 is a simplified front elevation of a machine tool in association with the improved work-handling mechanism.

The general arrangement of the work-handling mechanism forming this invention is shown in Fig. 1 of the drawings, in which a workpiece W is shown in working position between the driving headstock 20 and the tailstock 21.

The work W is positioned as indicated by grippers mounted on a loader carriage 24 (Fig. 10) which is supported on rolls 25 which travel on rails 26 mounted on frame members 27 carried by a stand or support 30 (Fig. 1). The opposite ends of the rails are mounted on a foot support or frame 31. The stand 30 may be secured to the headstock 20 or to some other associated part of the machine tool, and the frame 31 may be secured to the foundation on which the machine tool rests.

A motor M (Fig. 1) is mounted on the stand 30 and operates through connections to be described to move the carriage 24 from the operative position shown in full lines in Fig. 1 to the discharge and reloading position shown in broken lines. The workpiece shown at W' is in discharge and reloading position. The motor also raises and lowers the work grippers, as will be hereinafter described.

Loader carriage reciprocation

Figure 2:
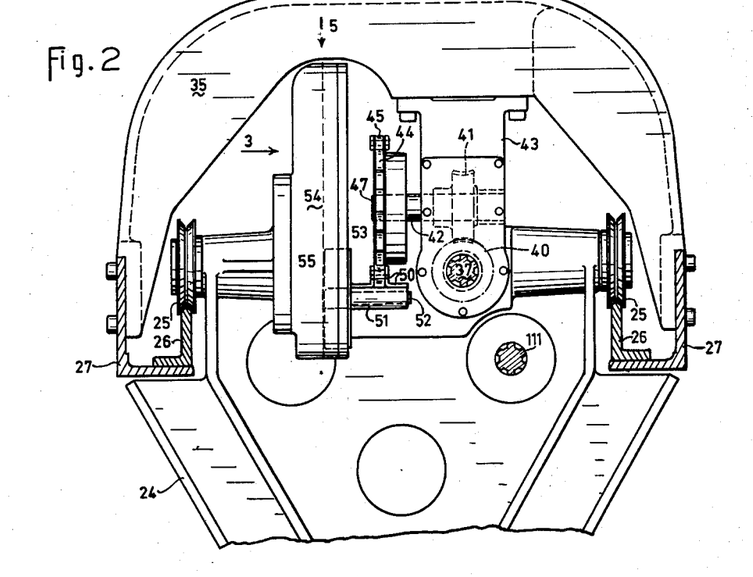
Fig. 2 is a left-hand end elevation of a loader carriage and associated chain-driving mechanism.
Figures 3, 4, 8, 9:
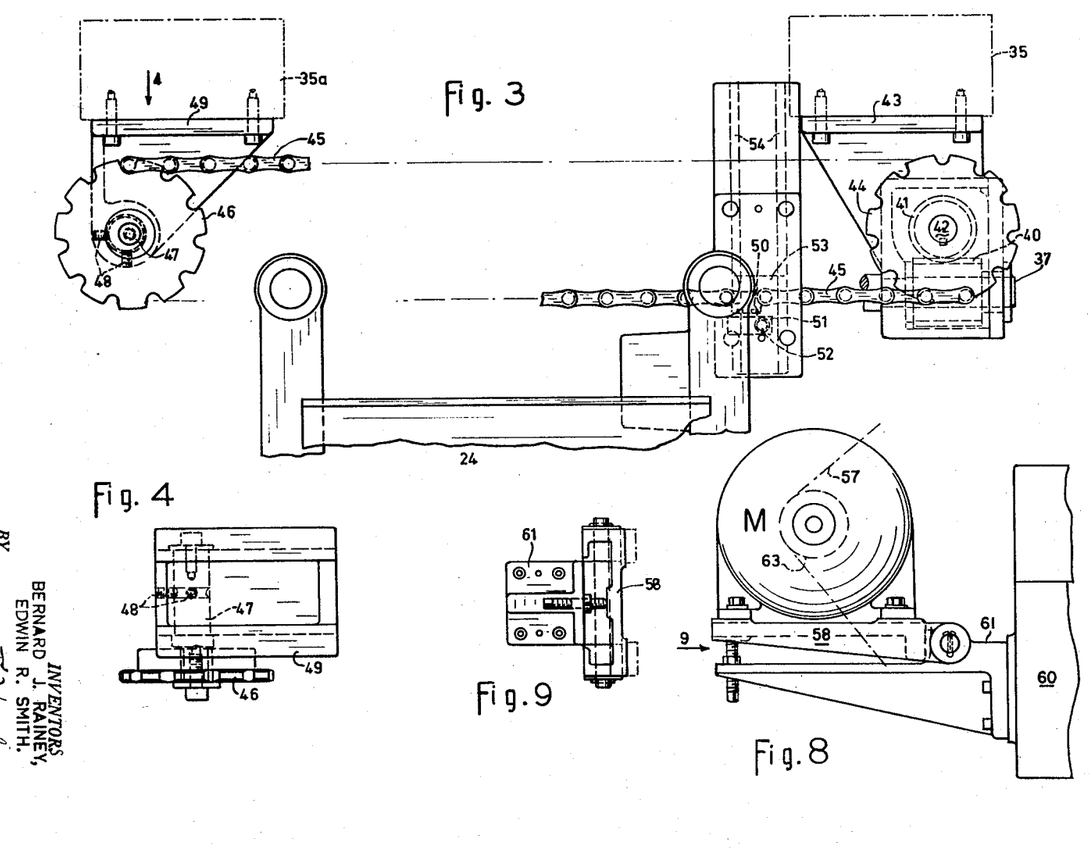
Fig. 3 is a back view of the chain drive, looking in the direction of the arrow 3 in Fig. 2.
Fig. 4 is a detail plan view, looking in the direction of the arrow 4 in Fig. 3.
Fig. 8 (Sheet 3) is a partial rear elevation, looking in the direction of arrow 8 in Fig. 7.
Fig. 9 is a detail plan view, looking in the direction of arrow 9 in Fig. 8.

Mounted on the rail stands or supports 27 (Fig. 2) are fixed frame members or bridges 35 and 35a (Figs. 2 and 3). Power is transmitted from the motor M through a gear box 36 (Fig. 1) to a splined shaft 37 (Fig. 2) which engages a female spline in a worm 40 shown dotted in Fig. 2. This worm 40 drives a worm wheel 41 which is keyed to a shaft 42 (Fig. 2). This mechanism is supported by a stand 43 which is secured beneath the fixed bridge 35.

Keyed to the end of shaft 42 is a roller chain sprocket 44 (Fig. 2) which drives a roller chain 45 which moves in a vertical plane around the sprocket 44 and around an idler sprocket 46 (Fig. 3) which revolves on a shaft 47. The shaft 47 is eccentrically mounted to provide adjustment for chain tightening, and this adjustment is maintained by set-screws 48. A bracket 49 which supports the shaft 47 is mounted on the bridge 35a (Fig. 3) which is toward the tailstock end of the machine.

Figure 5:
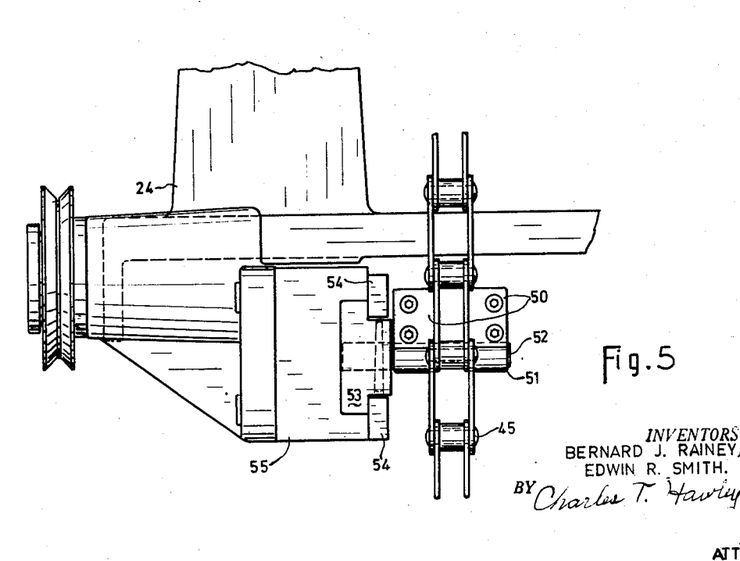
Fig. 5 (Sheet 2) is an enlarged detail plan view, looking in the direction of the arrow 5 in Fig. 2.

Two special side plates 50 (Figs. 2 and 5) are attached to the chain 45 to accommodate a block 51 (Fig. 3). Free to turn in the block 51 is a pin 52 (Fig. 5) which is pinned to a slide 53 which runs in ways 54 formed on a casting 55 which is attached to the frame of the loader carriage 24.

The worm 40 always rotates in the same direction, so that the chain 45 always moves in the same direction. However, as the side plates 50 pass the horizontal center line of the sprockets 44 and 46, the horizontal motion of the side plates 50 and associated parts is harmonically reversed.

The loader carriage 24 may thus be alternately moved toward the headstock 20 and toward the tailstock 21 and may be stopped at either end of its travel by stopping the rotation of the worm 40 when the pin 52 is at the horizontal center line of the first sprocket 44 or at the horizontal center line of the second sprocket 46. Rest periods may be thus provided at these points to accomplish unloading and loading of the workpiece at the operative carriage position, and discharging and reloading of the workpiece at the remote or inoperative position. As acceleration and deceleration at these reversal points is harmonic, shock is avoided in starting and stopping the loader carriage.

A screw and nut construction (Figs. 8 and 9) is provided to adjust and control the tension of the V belt 57 (Fig. 8) by lifting or releasing the pivoted plate 58.

Gear end and driving details

The reduction gear unit or box 36 (Fig. 1) is shown in detail in Figs. 6 to 9 inclusive.

A frame member 60 (Fig. 7) supports a gear housing 60a (Fig. 6) and is mounted on the stand 30 (Fig. 1) which is secured to the headstock 20. A bracket 61 (Fig. 8) supports the pivoted base 58 on which the drive motor M is mounted. A pulley 63 (Fig. 7) drives pulleys 64 and 65 through the V belt 57 indicated in Fig. 8. The pulley 65 (Fig. 6) is mounted on a clutch member 66 which is freely supported on a shaft 67 by ball bearings 68 and 69. Brake mechanism for the shaft 67 is shown at the right in Fig. 6. Compressed air may be introduced through a port 70 (Fig. 6) to an air cylinder 71. A piston 72 therein will then exert a pull on a rod 73 which projects through a thrust bearing 74 and has a lock nut 75. A seal 76 prevents air leakage from the cylinder 71. The air supply may be controlled by any suitable valve 77.

Figure 6:
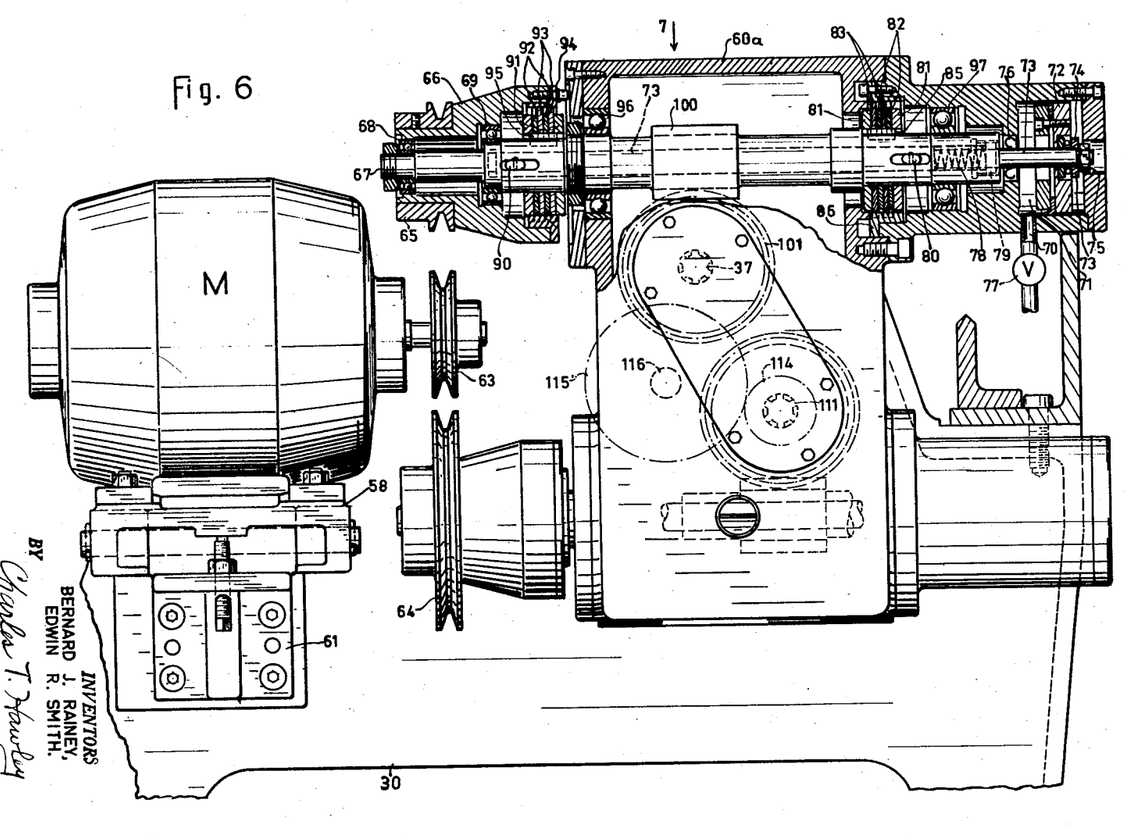
Fig. 6 is a left-hand end elevation of the head end construction.
Figure 7:
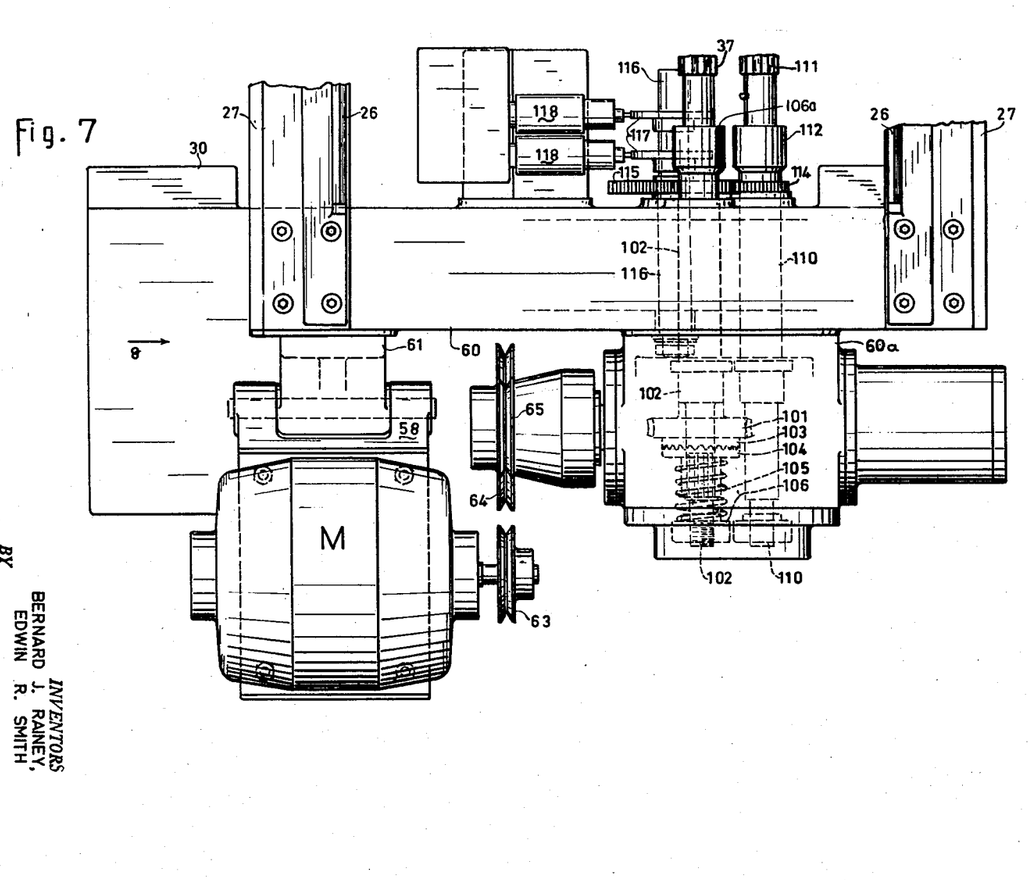
Fig. 7 is a partial plan view, looking in the direction of the arrow 7 in Fig. 6.

When the rod 73 is thus pulled to the right in Fig. 6, it compresses a spring 78 against a hollow screw 79 and withdraws a brake-pin 80 from end brake plates 81. This allows the inner plates 82 and the outer plates 83 to separate, thereby releasing the braking effect on the shaft 67.

The inner plates 82 (Fig. 6) are keyed to the shaft 67 by a key 85, and the outer plates 83 are secured to a brake spider 86 which is screwed to the cylinder 71 which in turn is clamped to the gear housing 60a.

A second crosspin 90 (Fig. 6) is also actuated by the rod 73. The pin 90 pulls end clutch plates 91, inside clutch plates 92 and outside clutch plates 93 together when air pressure is applied. The outside plates 93 are secured to a clutch spider 94 which is screwed to the rotating clutch member 66. The inside plates 92 are keyed to the driving shaft 67 by a key 95. The shaft 67 is mounted on bearings 96 and 97.

When air pressure is relieved at the port 70, the spring 78 pushes the rod 73 to the left and causes the pin 80 to force its brake clutch plates together, and the pin 90 is moved away from its clutch plates, so that the drive is disengaged.

When the shaft 67 is rotating, an integral worm 100 (Fig. 6) causes a worm wheel 101 to revolve. Worm wheel 101 (Fig. 7) is free to rotate on a shaft 102 and carries a toothed clutch plate 103. The mating plate 104 of the toothed clutch drives the splines of the shaft 102. These two clutch plates are held in engagement by a spring 105 which is loaded by a nut 106. The teeth on the plates 103 and 104 are of such shape that excessive load on the shaft 102 will cause the clutch parts 103 and 104 to slip out of engagement, thereby avoiding damage to the drive unit. The shaft 102 is connected to the spline shaft 37 by a coupling 106a and the shaft 37 reciprocates the chain 45 through the gearing previously described.

The clutch and brake mechanism used in conjunction with the pulley 64 is identical with that just described for the pulley 65. The pulley 64 may thus be connected to drive the shaft 110 which in turn is connected to drive spline shaft 111 (Figs. 10 and 7) by coupling 112. Spline shaft 111 operates the tailstock 21 (Figs. 1 and 16) and also operates the gripper slides on the loader carriage 24, as hereinafter explained.

Keyed to shaft 110 (Fig. 7) is a gear 114 which drives a gear 115, which in turn is keyed to a shaft 116. Cams 117 are clamped to the shaft 116 and are used to operate limit switches 118 in the electrical circuit which jointly controls the machine tool and the work-handling mechanism.

The gears 114 and 115 have the same ratio as corresponding gears in the carriage, so that the shaft 116 will make one complete revolution per cycle of loader operation.

Loader carriage slide drive

Figures 10, 11:
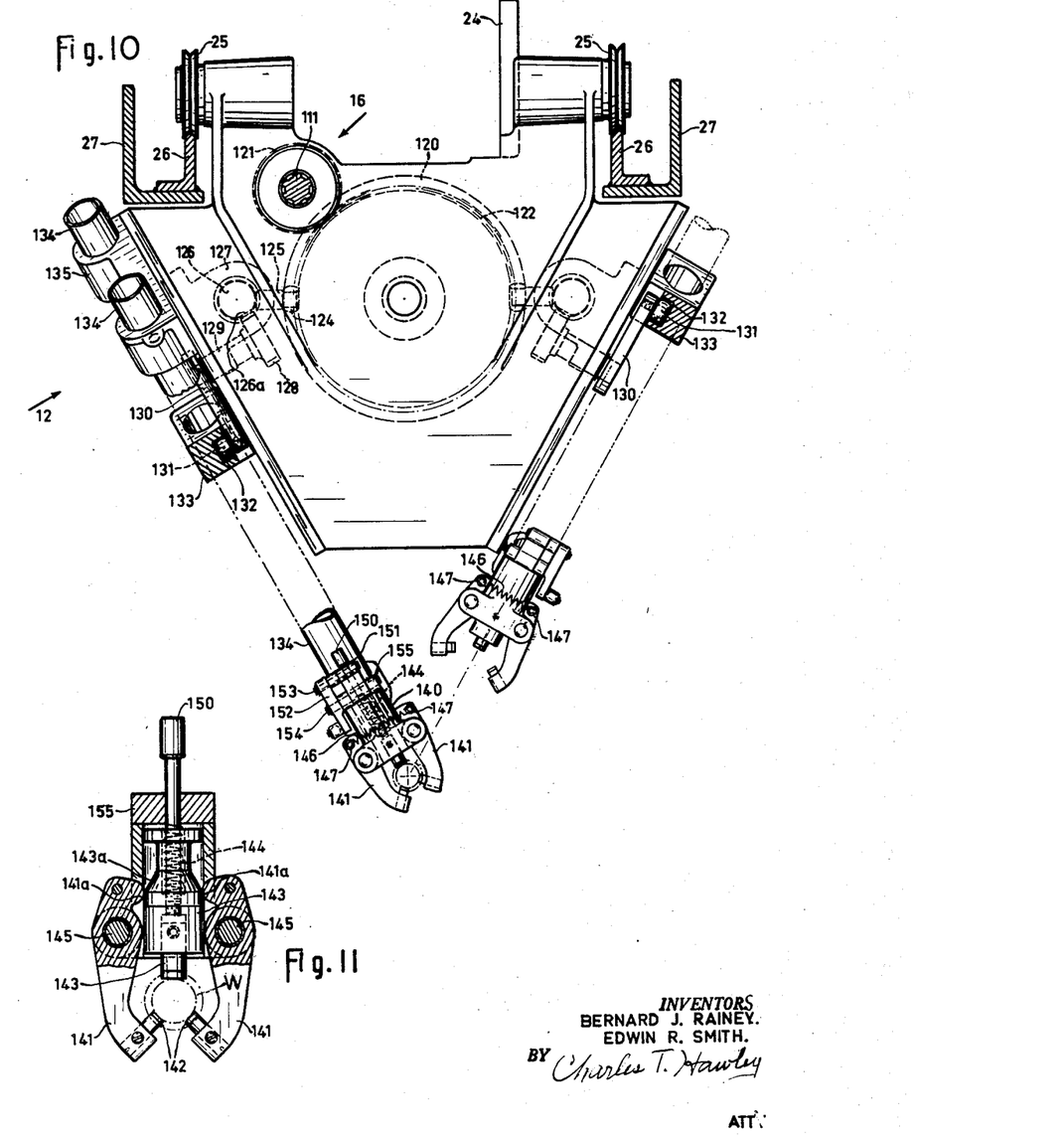
Fig. 10 is a right-hand end elevation, partly in section and showing the loader carriage and work slides, looking in the direction of the arrow 10 in Fig. 12 (Sheet 7)
Fig. 11 is an enlarged side elevation of a work gripper unit.
Figures 12, 13, 14, 15:
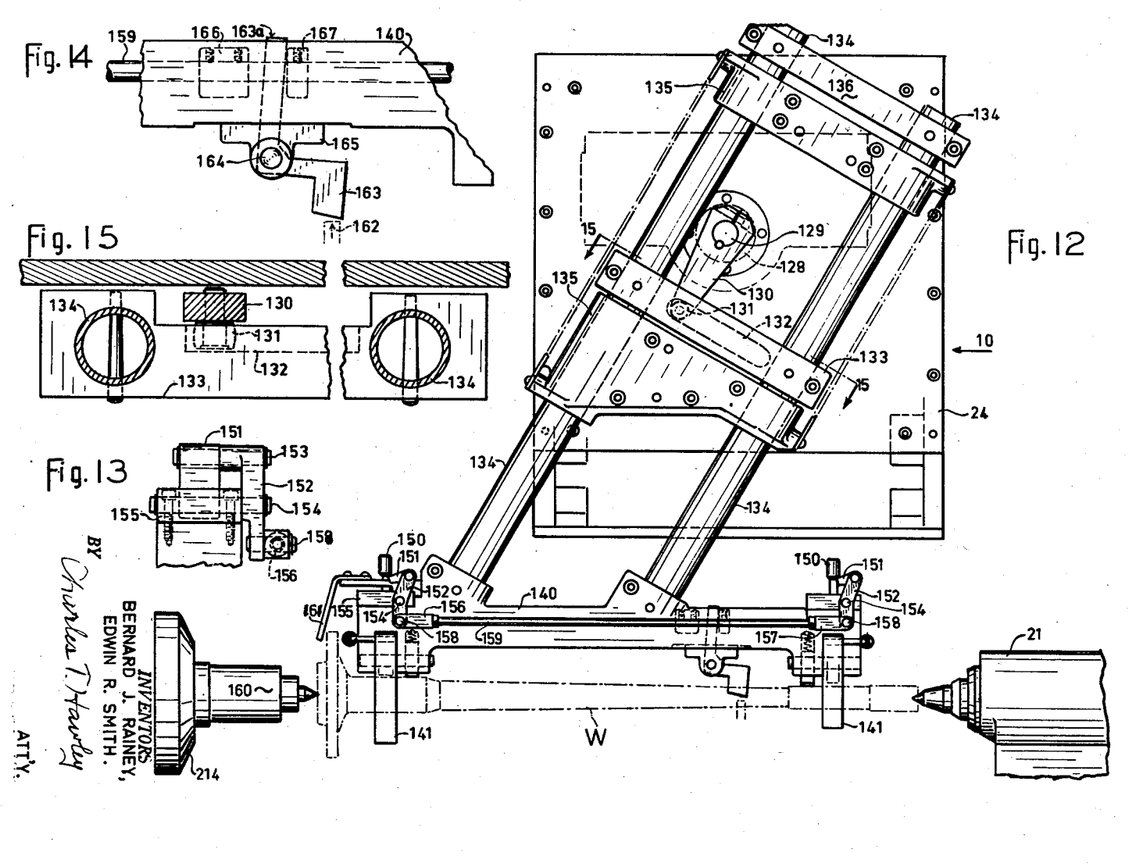
Fig. 12 is a front elevation of the loader carriage, looking in the direction of arrow 12 in Fig. 10.
Figs. 13 and 14 are detail views of certain gripper trip mechanisms to be described.
Fig. 15 is an enlarged detail sectional view, taken on the line 15—15 in Fig. 12.
Figures 16, 17, 18, 19:
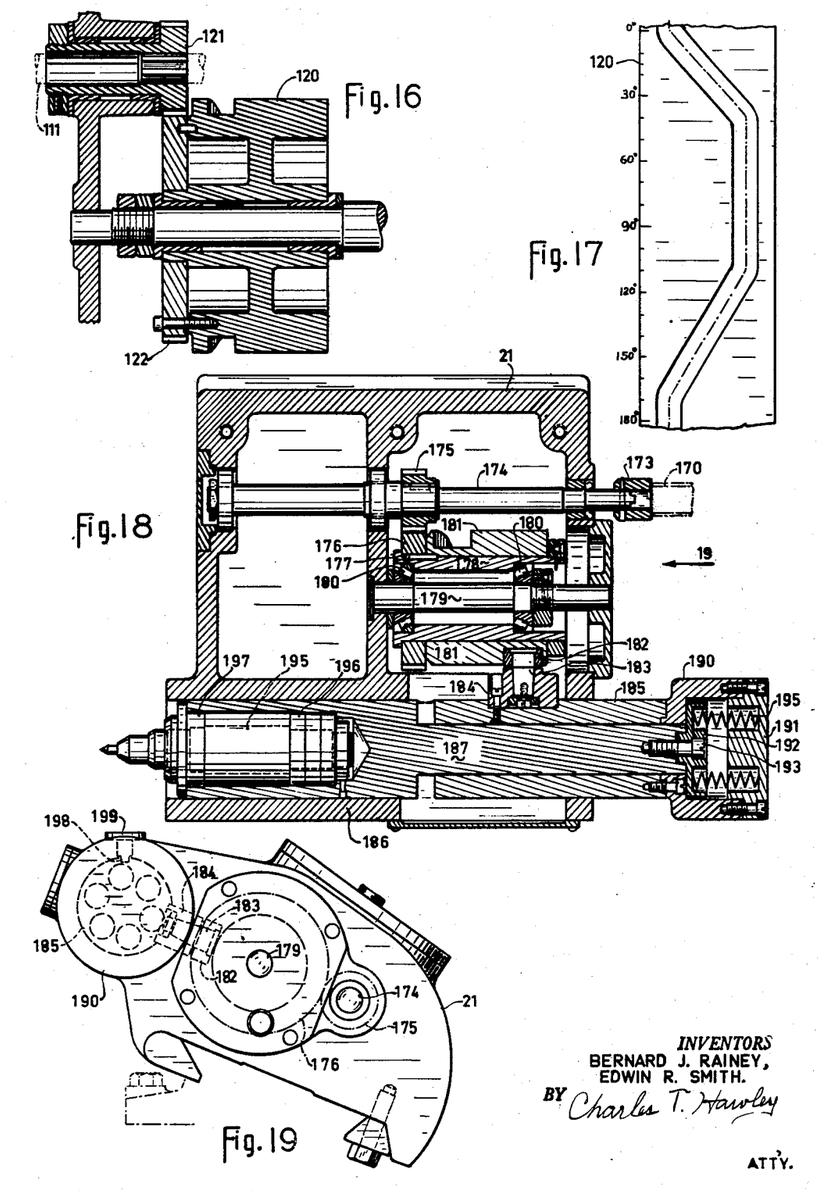
Fig. 16 is a detail sectional view of a drum cam and drive, looking in the direction of arrow 16 in Fig. 10.
Fig. 17 is a diagram of the drum cam track.
Fig. 18 is a top view of a special cam-operated tailstock, substantially in horizontal section.
Fig. 19 is a right-hand end view of the tailstock, looking in the direction of arrow 19 in Fig. 18.

The loader carriage slide drive is best shown in Figs. 10, 12 and 16. A drum cam 120 (Figs. 10 and 16) is rotatably mounted in the loader carriage 24 and is driven by a pinion 121 (Fig. 16) which engages a gear 122 associated with the drum cam. The pinion 121 is rotated by the splined shaft 111 (Fig. 7) which forms a part of the gear-end drive.

The loader carriage 24 (Fig. 10) is of V-shaped section and is supported by rolls 25 which travel on fixed rails 26 as previously described.

The drum cam 120 has a cam groove of the general path shown in Fig. 17. A roll 124 (Fig. 10) is rotatably mounted on a stud 125 fixed to a sliding cylindrical bar 126. The bar 126 is thus reciprocated longitudinally of the loader carriage and is slidable in bearings 127.

Rack teeth 126a are formed on the lower face of the bar 126 and engage a pinion 128 on a shaft 129 having a crank arm 130 (Fig. 12) fixed thereto. A roll 131 (Figs. 12 and 15) is seated in a longitudinal slot 132 in a cross frame member 133.

The member 133 (Fig. 12) is clamped to a pair of tubes 134 which are slidable in angularly-disposed bearings 135 fixed to the inclined side portions of the carriage 24. The upper ends of the tubes 134 are connected by a cross bar 136 which, together with the lower cross bar 133, provides a rigid sliding structure.

The cam path (Fig. 17) on the drum cam 120 is so designed that the crank arm 130 will alternately receive opposite rotational movements of 180°, and the framework carrying the work grippers is thereby alternately moved to extreme raised and to extreme lowered positions.

The carriage 24 is of such angular construction that both the loading and unloading grippers are at the center line of the lathe when in extreme lowered position. The drum cam 120 has one path only cut in it, and both rolls 124 run in this single path. Thus the loading and unloading slides are lowered and raised alternately and in definite timed relation.

The slides and slide-operating mechanism is the same on both sides of the carriage, except that certain parts must be of opposite hand.

Gripper units and operating mechanism

The lower ends of each pair of tubular slides 134 (Fig. 12) are seated in a gripper bar 140, which in turn supports a plurality of gripper units as shown in Fig. 10. The gripper units at the left in Fig. 10 are used in loading a rough workpiece into a lathe or other machine tool. The gripper units at the right are used for unloading a finished workpiece and differ only in minor details from the loading gripper units.

The gripper units and their operating mechanism are all mounted on the gripper bars 140 (Fig. 12) and are shown in full detail in Figs. 10 to 12.

Each gripper unit comprises jaws 141 (Fig. 11) which grip the workpiece W at angularly spaced points by adjustable pads 142. The workpiece is held against these pads 142 by means 143 to be described.

The action of the gripper components is as follows: With the gripper units open, a workpiece W is introduced to the gripper jaws 141, either by external means or by advance movement of the bar 140 toward a workpiece at rest. The workpiece will engage or will be engaged by the lower end 143 of a spool-shaped plunger 143a (Fig. 11), causing the parts 143–143a to move relatively upward against the resistance of a spring 144. Such movement causes the conical upper end portion of the plunger 143a to spread the rounded projections 141a on the upper ends of the gripper jaws 141. This causes the gripper jaws 141 to pivot about pins 145 and against the resistance of a tension spring 146 (Fig. 10) attached to pins 147 on the gripper jaws 141.

Each workpiece W is pushed or entered beyond the theoretical center of the grippers to allow the workpiece to get well inside the gripper jaws 141 before the grippers are closed thereon.

A rod 150 (Fig. 11) is screwed into the plunger 143. When the entering travel of the workpiece W into the grippers is sufficient, a latch 151 (Fig. 10) drops under the head of rod 150 and holds the gripper mechanism closed.

The latch 151 (Fig. 13) is connected to a lever 152 by a pin 153. The lever 152 pivots about a pin 154 in a block 155. Turnbuckle ends 156 and 157 (Fig. 12) are connected to lever arms 152 by pins 158 and these ends 156 and 157 are connected to each other by a rod 159.

To release the gripper units, the workpiece W is pushed by the tailstock 21 (Fig. 12) towards a driver 160 on the live work spindle. By this endwise motion of the workpiece W, a latch-release arm 161 (Fig. 12) is moved by the workpiece W. This withdraws both latches 151 from under the heads of the rods 150, and the gripper jaws 141 will be opened by the action of the springs 144 and 146 as the grippers are raised upward and away from the workpiece W.

The release of the grippers on the rear or unloading side of the carriage is accomplished by a plunger 162 (Fig. 14) that moves up with certain parts which receive the finished workpiece. Such movement actuates a lever 163 pivoted on a pin 164 on a block 165 which is secured to the rear gripper bar 140. The upper end 163a of the lever 163 hits a block 166 mounted on the turnbuckle rod 159 and moves the rod to unlatch the rear grippers. The lower section of lever 163 is heavy enough to reset the latch 151 by causing the upper end 163a of the lever 163 to push on the block 167 after the workpiece W has been removed.

Tailstock mechanism

Figures 20, 21, 22, 23, 24:
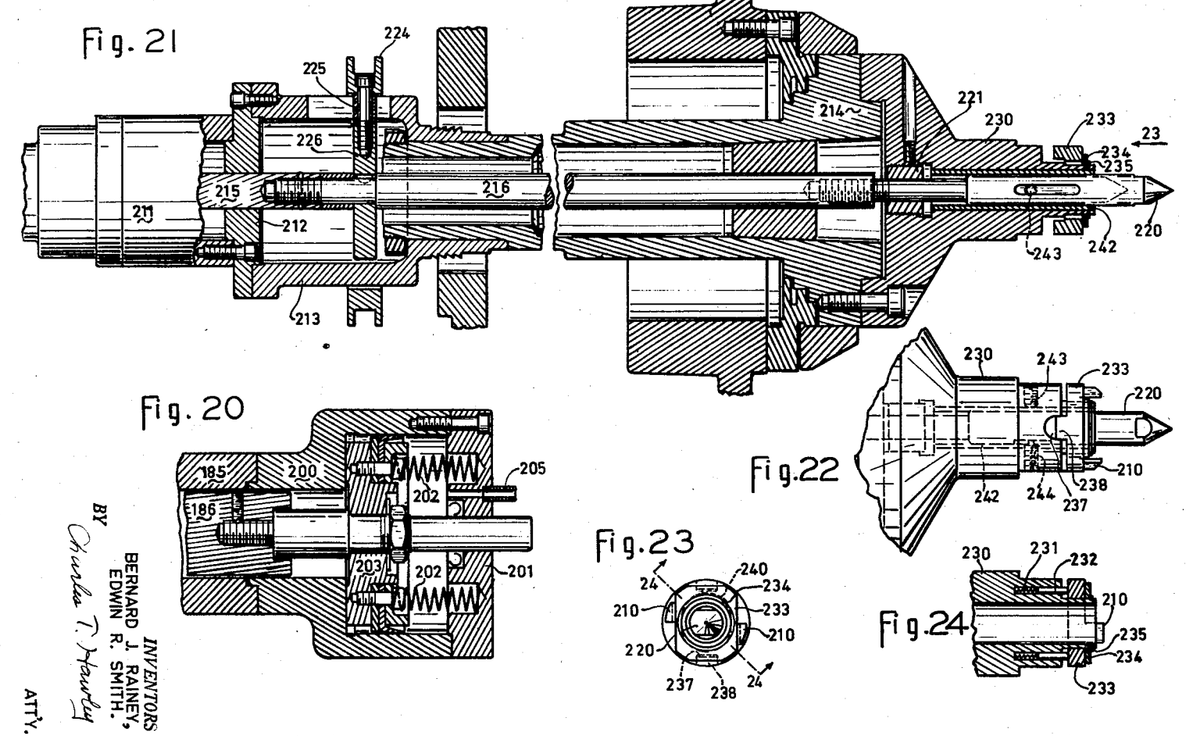
Fig. 20 is a detail sectional front view showing a modification of certain parts shown in Fig. 18.
Fig. 21 is a sectional front elevation of the work-driving spindle and associated parts.
Fig. 22 is a partial top view showing certain parts in Fig. 21 in a different position.
Fig. 23 is an end view, looking in the direction of arrow 23 in Fig. 21.
Fig. 24 is a detail longitudinal sectional view, taken along the line 24—24 in Fig. 23.

A special cam-operated tailstock 21 is used in conjunction with this loader and is best shown in Figs. 18 to 20. Power is supplied through a shaft 170 (Fig. 1) which is chain-driven through sprockets 171 and 172 from shaft 111 connected to the gear box 36 previously described.

A coupling 173 (Fig. 18) connects the shaft 170 to a shaft 174 in the tailstock and on which a pinion 175 is mounted. The pinion 175 drives a gear 176 which is connected by a key 177 to a sleeve 178 which revolves about a stationary shaft 179 on bearings 180. Also keyed to the sleeve 178 is a drum cam 181 (Fig. 18) which, as it revolves, imparts a linear motion to a follower which comprises a roll 182 and a roll stud 183 mounted in a block 184 which is secured to a sleeve 185 which slides in the tailstock housing 186.

It is desirable to connect sleeve 185 to the tailstock quill 187 by some flexible means to permit a small amount of relative motion to accommodate small variations in workpiece length and in center depths.

In the all-spring method of Fig. 18, a housing 190 is screwed to sleeve 185, and a cover 191 is screwed to the housing 190. A plate 192 is attached to the quill 187 by a screw 193. Several heavy springs 195 are set in pockets in the plate 192 and in the cover 191, and these springs tend to separate the cover 191 and the plate 192. As the quill 187 is moved to the left by the action of the drum cam 181, the spring assembly will be inactive until resistance to the motion of quill 187 is encountered, such as hitting the workpiece W.

When end motion of the quill 187 is stopped while the sleeve 185 is still moving to the left, the springs 195 will be compressed, exerting a thrust on the workpiece.

When withdrawal of the quill 187 is required, the drum cam 181 causes the sleeve 185 to move to the right. The quill 187 will remain stationary until the housing 190 contacts the plate 192 and thus relieves the spring pressure and then the quill 187 to the right.

The drum cam 181 is driven by the shaft 170 which in turn is driven by the shaft 111, and the shaft 111 also drives the drum cam 120 which operates the loader slides and gripper bars. The gearing to both drum cams 120 and 181 is in the same ratio, so that they revolve at the same rate.

The in-and-out motion of the quill 187 is thus synchronized with the motions of the loader slides and gripper bars, and the correct sequence of operations is mechanically and positively determined.

The tail spindle 195 (Fig. 18) is mounted in standard manner on bearings 196 and 197 to provide rotation for a tail center seated in a tapered hole in the tail spindle 195. A key 198 (Fig. 19) is held in place by a cover 199 and engages a long keyway in the quill 187 to prevent rotation of said quill.

When it is desired to have a low pressure for initial contact of the tail center with the workpiece but a higher pressure during the cutting cycle, the construction shown in Fig. 20 may be used. A cylinder 200 is screwed to the sleeve 185, and a cover 201 with spring pockets is secured to the cylinder 200. Springs 202 are installed between the cover 201 and a piston plate 203.

The springs 202 are not as heavy as the springs 195 used in Fig. 18. When the workpiece is contacted, only a relatively light spring load is applied. After a given interval and before machining starts, air may be supplied through a port 205 to apply a higher pressure to the workpiece W.

Work drive

Figs. 21 to 24 disclose the details of the work spindle driving mechanism shown generally at 160 in Figs. 1 and 12.

Each workpiece W is centered at both ends, and the end toward the headstock 20 has a forged recess of suitable shape to receive driving lugs 210 (Fig. 22) and to be rotated by them. An air cylinder 211 (Fig. 21) having an adapter plate 212 is mounted on a sleeve 213 which is formed on or attached to a spindle 214 which is powered by a separate motor drive (not shown). A piston in the cylinder 211 pushes a piston rod 215 against an operating rod 216 and thus normally holds the work center 220 in an extended position.

When a workpiece W is placed between the head and tail centers and tailstock pressure is applied, this pressure will overcome the low pressure in the cylinder 211 and will force the head center 220 against an adjustable stop 221 (Fig. 21) provided the driving lugs 210 register correctly with the special recesses provided in the end of the workpiece W.

The only time the air is reversed in the cylinder 211 is when a workpiece W is being moved to or from working position in the lathe, and at which time the center 220 must be withdrawn to provide adequate clearance.

A grooved ring 224 (Fig. 21) is mounted on spacers 225 in a plate 226 which is attached to the rod 216. The ring 224 operates certain external limit switches to indicate the position of the live center 220 with respect to certain interlocking relays.

A driver cap 230 (Fig. 21) is attached to the spindle 214, and springs 231 and plungers 232 (Fig. 24) in the driver cap 230 hold a driver plate 233 away from the driver cap 230 as far as the depth of cavity in the workpiece W will permit. Full advantage of the depth of cavity in the workpiece W is thus taken, while at the same time allowing for variations in the depths of said cavities. The driver plate 233 is restrained from falling off of the driver body 230 by a retaining plate 234 (Fig. 21) and a snap ring 235.

Torque is transmitted from the driver cap 230 to the driver plate 233 through slots 237 (Fig. 23) in the driver cap 230 and lugs 238 (Fig. 22) on the driver plate 233.

Since the hole 240 (Fig. 23) in the driver plate 233 is oval, transverse motion of the driver plate 233 with respect to the driver cap 230 is provided, thus equalizing the driving effort exerted by the two driving lugs 210.

The center 220 (Fig. 21) slides in a hardened bushing 242 held in place in the cap 230 by setscrews 243. The head center 220 is prevented from rotating in the bushing 242 by setscrews 244 (Fig. 22) engaging long keyways in the center 220.

Any usual or suitable control mechanism may be provided to effect the sequence of operations about to be described. As an example of such suitable control mechanism and including limit switches and co-related contact devices, reference is made to Figure 3 of Dinsmore Patent No. 2,714,324.

Operation

Assume that the machine is about to complete a cutting or other operation on a workpiece W. The loader carriage 24 is at the left or head end of its travel, the machine spindle 214 is running at full speed under separate power, and the tail center 195 is in pressure-contact with the work.

The finished workpiece is then removed and a new unfinished workpiece is inserted in the following series of steps:

(1) When cutting is completed, the tools are withdrawn and a limit switch is activated to cause the machine to reduce its speed to permit handling of the workpiece.

(2) The same limit switch causes the air-controlled clutches to operate the carriage slides, so that the rear or unloading slide comes down to the finished workpiece and its grippers automatically grasp the workpiece.

(3) The tail center is withdrawn and the head center is simultaneously advanced, pushing the work axially along through the grippers. The head center is then retracted to clear the workpiece.

(4) The finished workpiece is lifted clear of the machine by the unloading slide, and a new and unfinished workpiece is lowered to the center line of the machine by the loading slide.

(5) The head center is advanced and the tail center is also advanced but with no air in the tailstock cylinder. The force of the springs in the tailstock is sufficient to act through the workpiece to push the head center into the driver cap 230 until the driving lugs 210 are seated in recesses in the end of the workpiece.

(6) The grippers still grasp the workpiece, so that the workpiece does not rotate and the slowly-revolving driver lugs will eventually line up with the recesses in the end of the workpiece.

(7) The springs in the tailstock then push the workpiece axially until the head center is against its stop and the workpiece is in position to be machined. The grippers are then opened, due to the longitudinal engagement of the workpiece against the latch release arm 161.

(8) Air is now supplied to yieldingly advance the tail center while the loading slide moves upward.

(9) The machine is now shifted into high speed, the cutting tools advance, and cutting begins. At the same time, the air-operated clutch which controls slide travel is de-energized, and the second air-operated clutch which controls carriage travel is energized.

(10) The chain 45 pulls the carriage 24 to the right-hand or discharge end of the mechanism, and the second clutch is then de-energized.

(11) The finished workpiece is discharged and a new and unfinished workpiece is supplied to the loading slide by means not herein described.

(12) The second air-operated clutch is again energized and the carriage is returned to its extreme left-hand position.

(13) The second clutch is then de-energized, leaving the loading carriage 24 in its initial position and ready to repeat its cycle of movements when the machine has finished its cutting or other operation on the workpiece in machining position.

Conclusion

The details of construction of the improved work-handling mechanism have been fully shown and described, and the sequence of operations has been clearly set forth.

The mechanism herein shown has been found unusually well adapted to its desired purposes.

Having thus described our invention and the advantages thereof, we do not wish to be limited to the details herein disclosed, otherwise than as set forth in the claims, but what we claim is:

1. In a loading mechanism for a machine tool comprising a loader carriage with loading and unloading units, means to mount and reciprocate said carriage substantially horizontally between loading and reloading positions, a gripper mechanism at the base of each unit movable into gripping relation with a workpiece through relative movement of the workpiece and associated gripper mechanism, means operable to upwardly and downwardly slide said units alternately in opposite directions, means operable to effect release of a workpiece in the lowest position of the gripper mechanism of the loading unit through axial movement of the latter workpiece in and relatively to the last-mentioned gripper mechanism, and means operable to effect release of a workpiece in a retracted position of the gripper mechanism of the unloading unit.

2. A loading mechanism as set forth in claim 1, having the paths of sliding movement of said units intersecting and of an extent whereby both gripper mechanisms will occupy the same zone at their lower limits of sliding movement.

3. A loading mechanism as set forth in claim 1 in which the loader carriage has a cam drum operable to move the unloading and loading units alternately up and down and provides a rest period at each end of each movement, and in which the cam drum has a single cam groove alternately engaging the two units.

4. In a loading mechanism as set forth in claim 1 having driving mechanism provided with reversely operated clutches to control carriage reciprocation and gripper unit movements respectively, and in which both clutches are controlled by a single swiveled operated and operatively connected sliding rod.

5. A loading mechanism as set forth in claim 1 in which the gripping mechanisms each have three gripping members and in which two of said gripping members are closed and locked on the workpiece by the engagement of the workpiece by the third gripping member.

References Cited in the file of this patent

UNITED STATES PATENTS

| | | |
|---|---|---|
| 304,479 | Weston | Sept. 2, 1884 |
| 1,302,861 | Schott | May 6, 1919 |
| 1,933,225 | Smith | Oct. 31, 1933 |
| 2,264,160 | Flygare | Nov. 25, 1941 |
| 2,494,196 | Pesqueira | Jan. 10, 1950 |
| 2,546,684 | Ashton | Mar. 27, 1951 |
| 2,570,660 | Gamble | Oct. 9, 1951 |
| 2,614,447 | Lomazzo | Oct. 21, 1952 |
| 2,714,324 | Dinsmore | Aug. 2, 1955 |
| 2,739,717 | Dinsmore | Mar. 27, 1956 |
| 2,746,613 | Meyer | May 22, 1956 |